US012626223B2

(12) United States Patent
Hazan

(10) Patent No.: US 12,626,223 B2
(45) Date of Patent: May 12, 2026

(54) METHOD AND SYSTEM FOR ALLOCATING AN AGV VEHICLE IN A PLANT LOCATION

(71) Applicant: Siemens Industry Software Ltd., Tel Aviv (IL)

(72) Inventor: Moshe Hazan, Elad (IL)

(73) Assignee: Siemens Industry Software Ltd., Tel Aviv (IL)

( * ) Notice: Subject to any disclaimer, the term of this patent is extended or adjusted under 35 U.S.C. 154(b) by 166 days.

(21) Appl. No.: 18/557,995

(22) PCT Filed: Apr. 29, 2021

(86) PCT No.: PCT/IB2021/053561

§ 371 (c)(1),
(2) Date: Oct. 30, 2023

(87) PCT Pub. No.: WO2022/229677

PCT Pub. Date: Nov. 3, 2022

(65) Prior Publication Data

US 2024/0220924 A1 Jul. 4, 2024

(51) Int. Cl.
G06Q 10/087 (2023.01)
G05D 1/69 (2024.01)
(Continued)

(52) U.S. Cl.
CPC .............. G06Q 10/087 (2013.01); G05D 1/69 (2024.01); G05D 2105/20 (2024.01); G05D 2107/70 (2024.01)

(58) Field of Classification Search
None
See application file for complete search history.

(56) References Cited

U.S. PATENT DOCUMENTS

| | | | |
|---|---|---|---|
| 10,538,398 B2 * | 1/2020 | Miele ................... | B65G 1/1375 |
| 10,613,533 B1 * | 4/2020 | Payson ................ | G05D 1/0088 |

(Continued)

FOREIGN PATENT DOCUMENTS

| | | |
|---|---|---|
| WO | WO 2019104045 A1 | 5/2019 |
| WO | WO 2020143880 A1 | 7/2020 |
| WO | WO 2022023797 A1 | 2/2022 |

OTHER PUBLICATIONS

Schulze et al., "The Approach of Automated Guided Vehicle Systems", IEEE, 2006, retrieved on [Jun. 24, 2021]. Retrieved from the internet <URL: https://ieeexplore.ieee.org/stamp/stamp.jsp?tp=&arnumber=4125635> entire document.

(Continued)

*Primary Examiner* — Fateh M Obaid
(74) *Attorney, Agent, or Firm* — Laurence A. Greenberg; Werner H. Stemer; Ralph E. Locher

(57) ABSTRACT

Systems and a method control and allocate an automated guided vehicle (AGV) at a plant location of a plant. An order generator is enabled to be configured with an anticipating logical rule whose conditional statement includes a set of anticipating plant status conditions whose fulfillment causes the order generator to send to a fleet manager a corresponding AGV dummy transport order. The AGV dummy transport order requests an allocation of an AGV vehicle, in a busy state, to a plant location until a set of corresponding anticipated conditions are satisfied or until a predefined timer expires.

20 Claims, 9 Drawing Sheets

(51) Int. Cl.

*G05D 105/20*        (2024.01)

*G05D 107/70*        (2024.01)

(56)              References Cited

U.S. PATENT DOCUMENTS

| | | | |
|---|---|---|---|
| 11,030,570 B2 * | 6/2021 | Raut | G08G 1/202 |
| 2006/0271422 A1 * | 11/2006 | Rakesh | G06Q 10/06 |
| | | | 705/7.31 |
| 2010/0311173 A1 | 12/2010 | Baucells Guiteras | |
| 2013/0177379 A1 * | 7/2013 | Hoffman | B65G 1/00 |
| | | | 414/800 |
| 2014/0100999 A1 * | 4/2014 | Mountz | G06Q 10/087 |
| | | | 705/28 |
| 2017/0098164 A1 * | 4/2017 | Iyer | G06Q 10/0631 |
| 2017/0152106 A1 | 6/2017 | Hofmann | |
| 2017/0161663 A1 * | 6/2017 | Miele | G06Q 10/06315 |
| 2018/0017964 A1 * | 1/2018 | Li | G05D 1/0022 |
| 2018/0036845 A1 | 2/2018 | Thorwarth | |
| 2018/0276595 A1 | 9/2018 | Gariepy et al. | |
| 2019/0101901 A1 * | 4/2019 | Zimmermann | G05B 19/41895 |
| 2020/0231386 A1 | 7/2020 | Shiu et al. | |
| 2021/0042705 A1 * | 2/2021 | Suen | G06Q 10/0838 |
| 2021/0158270 A1 * | 5/2021 | Singh | G06Q 10/08 |

OTHER PUBLICATIONS

Yao et al., Improving Just-in-Time Delivery Performance of IoT-Enabled Flexible Manufacturing Systems with AGV Based Material Transportation, Sensors journal, Nov. 6, 2020, p. 2-25, vol. 20, issue 21, article 6333, MDPI.

* cited by examiner

Figure 8:
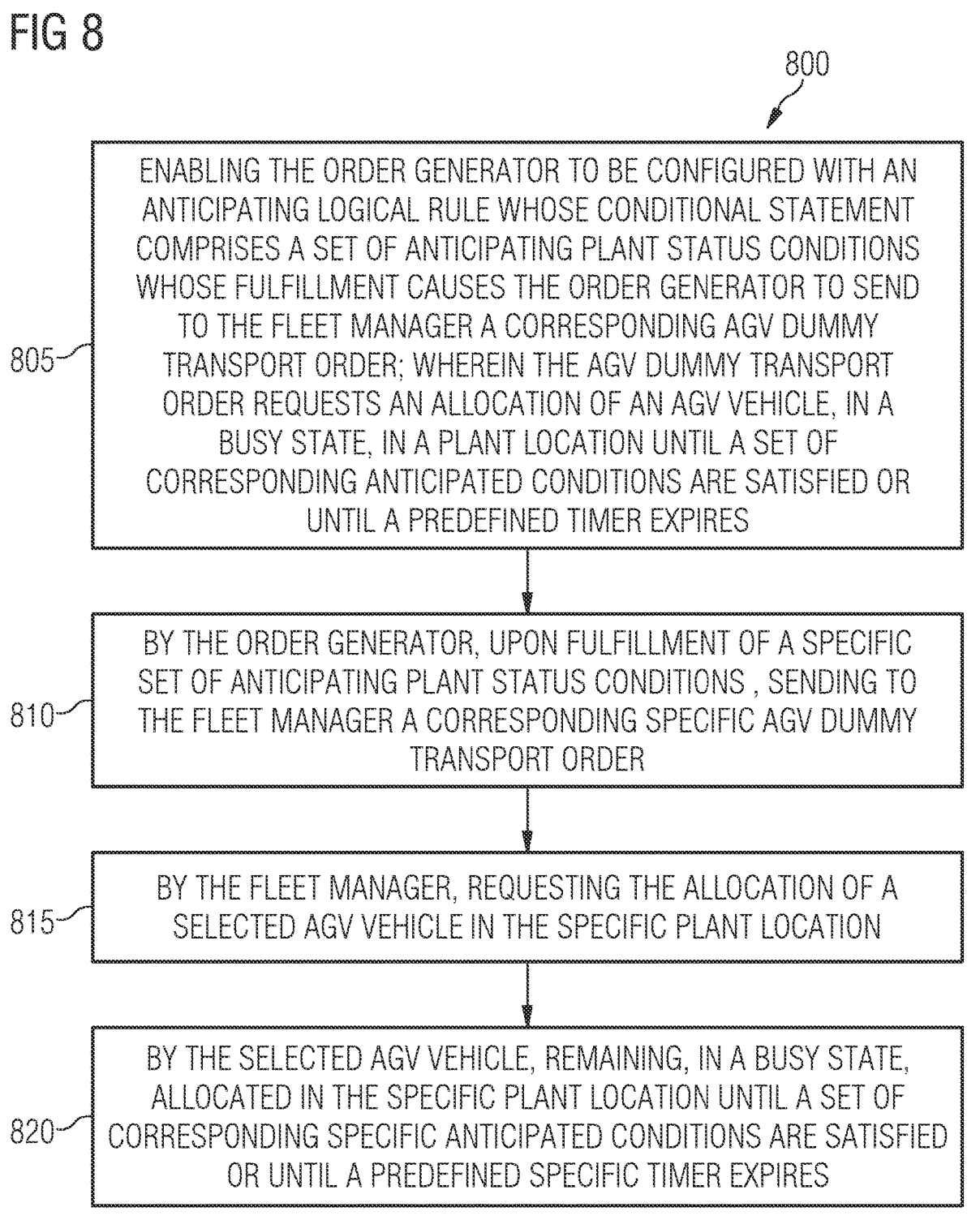

| |
|---|
| ENABLING THE ORDER GENERATOR TO BE CONFIGURED WITH AN ANTICIPATING LOGICAL RULE WHOSE CONDITIONAL STATEMENT COMPRISES A SET OF ANTICIPATING PLANT STATUS CONDITIONS WHOSE FULFILLMENT CAUSES THE ORDER GENERATOR TO SEND TO THE FLEET MANAGER A CORRESPONDING AGV DUMMY TRANSPORT ORDER; WHEREIN THE AGV DUMMY TRANSPORT ORDER REQUESTS AN ALLOCATION OF AN AGV VEHICLE, IN A BUSY STATE, IN A PLANT LOCATION UNTIL A SET OF CORRESPONDING ANTICIPATED CONDITIONS ARE SATISFIED OR UNTIL A PREDEFINED TIMER EXPIRES |

805

| |
|---|
| BY THE ORDER GENERATOR, UPON FULFILLMENT OF A SPECIFIC SET OF ANTICIPATING PLANT STATUS CONDITIONS , SENDING TO THE FLEET MANAGER A CORRESPONDING SPECIFIC AGV DUMMY TRANSPORT ORDER |

810

| |
|---|
| BY THE FLEET MANAGER, REQUESTING THE ALLOCATION OF A SELECTED AGV VEHICLE IN THE SPECIFIC PLANT LOCATION |

815

| |
|---|
| BY THE SELECTED AGV VEHICLE, REMAINING, IN A BUSY STATE, ALLOCATED IN THE SPECIFIC PLANT LOCATION UNTIL A SET OF CORRESPONDING SPECIFIC ANTICIPATED CONDITIONS ARE SATISFIED OR UNTIL A PREDEFINED SPECIFIC TIMER EXPIRES |

820

METHOD AND SYSTEM FOR ALLOCATING AN AGV VEHICLE IN A PLANT LOCATION

FIELD AND BACKGROUND OF THE INVENTION

The present disclosure is directed, in general, to computer-aided design, visualization, and manufacturing ("CAD") systems, product lifecycle management ("PLM") systems, product data management ("PDM") systems, production environment simulation, and similar systems, that manage data for products and other items (collectively, "Product Data Management" systems or PDM systems). More specifically, the disclosure is directed to systems related to automated guided vehicles ("AGV") systems in the field of industrial automation.

In field of industrial automation, AGV systems take an increasingly important role in the logistics of manufacturing plants.

In a typical AGV system, the AGV fleet manager ("FM") is responsible for ensuring a smooth routing of the AGV vehicle fleet on the plant carpet by determining which selected AGV vehicle is to be dispatched in a desired location of a plant working area in order to execute specific transport requests.

FIG. 2 schematically illustrates, for explanatory purposes, a simplified block diagram of modules for managing the movements of AGV vehicles and the movements of industrial robots in a real plant floor.

The fleet manager 201 receives AGV transport orders by the order generator ("OG") 202, such transport orders are typically based on the fulfillments of logical rules 212 on plant status conditions received via plant signals 204; whereby the plant signals include also signals from sensors. Such logical rules 212 typically determine when/which transport orders are to be sent to the FM module 202.

Based on the received transport orders, the fleet manager 201 typically sends corresponding transport task requests to the selected AGV vehicles 221 by managing the dispatching of its AGV fleet via routing algorithms by taking into account signals and statuses received from the AGV vehicles 221 and by taking into account signals (such connection is in FIG. 2 not shown) received from other plant entities including the plants signals 204.

Those skilled in the art will recognize that the block diagram of FIG. 2 is a very simplified explanatory schema of the functioning of industrial AGV systems and it does not include the full schema structure of possible modules, devices and/or of possible respective interactions. For example, a connection between the plant signals 204 and the fleet manager 202 is in FIG. 2 not shown. For example, device servers are in FIG. 2 not shown, examples of device servers include, but are not limited by, a Warehouse Control System ("WCS") or other systems such as Supervisory Control and Data Acquisition ("SCADA"), Distributed Control System ("DCS") for controlling various plant mechanisms. Examples of OG modules 202 include, but are not limited by, a Warehouse Management System, a Manufacturing Execution System or any other module capable of generating AGV transportation orders for the fleet manager 201.

Thus, as schematically illustrated in FIG. 2, the movements of the AGV vehicles 221 on the plant floor are managed by the fleet manager 201 which is dispatching transport tasks upon reception of OG transport orders. The movements of the robots 225 are managed by the Programmable Logic Controller ("PLC") module 205 which decides when/which robotic programs are to be executed for each robot. For example, once a given robot 225 gets from the PLC controller 205 a green light to perform a predefined program, the given robot deterministically performs its predefined program while exchanging signals with the PLC controller 205, e.g. in order to get permissions before entering into a risky zone during the program execution.

During plant operations, the AGV vehicles interact during their transport tasks with a large variety of factory entities located on the plant shop floor. Examples of factory entities include, but are not limited by, mechanisms positioned on the AGV vehicle motion path (e.g. automatic doors, elevators, traffic lights, etc) and mechanisms related to the AGV vehicle tasks (e.g. conveyors, robots, fixtures, etc). Examples of static factory entities interacting with the AGV vehicle include, but are not limited by walls, fences, crates, etc. Examples of dynamic factory entities interacting with the AGV system include, but are not limited by, human workers, man-controlled forklifts and other predictable and unpredictable moving objects etc.

In manufacturing facilities, the AGV deployment engineers are assigned the challenging engineering task of deploying AGV systems by adjusting their interactions with the factory entities in order to optimize the routing algorithm of the AGV fleet manager at the plant floor.

Nowadays, a Virtual commissioning ("VC") software application may be employed to achieve a realistic AGV simulation for assisting the AGV deployment engineers in verifying and validating the interactions between the AGV system and the factory entities.

PCT/IB2020/057254 teaches an advantageous technique to achieve a realistic AGV simulation system and to simulate both navigations and kinematics; this technique includes steps like modeling the virtual shopfloor digital model in a simulator, connecting the virtual digital model to the realistic system, building up the simulation scenario, running the realistic simulation and refining the AGV system design until the results meet the desired optimization requirements.

FIG. 3 schematically illustrates an exemplary block diagram of a realistic AGV simulation system. The OG module 302 interacts with the FM module 301. The simulator 303 interacts with the FM module 301 and with the PLC controller 304.

The simulator 303 is a virtual tool for simulating the whole digital plant operations with all its resources including robots, AGV vehicles, conveyors, turn tables, humans and other factory entities and mechanisms. An example of such a simulator is a Computer Aided Robotic ("CAR") tool. Those skilled in the art will recognize that the modules 301, 302, 303 interacting with the virtual simulator 303 might be virtual emulated modules, real software modules, real hardware modules or any combination thereof. Those skilled in the art will recognize that this block diagram of FIG. 3 is a very simplified explanatory schema of a realistic AGV simulation system and it does not include the full schema structure of possible modules, devices and/or of possible respective interactions.

FIG. 4 schematically illustrates an exemplary GUI screenshot of a virtual plant in a simulator. The simulated virtual plant 401 comprise three robots 402, six AGV vehicles 403, the AGV trajectories 404 on the plant carpet and trucks 405 for deliveries and collections.

Thus, as above explained, the AGV deployment engineers may make use of virtual simulators 303 to refine the AGV system until their desired optimization requirements are met.

In any case, after the conclusion of the commissioning phase—achieved with or without VC software assistance— the AGV fleet manager 201 typically functions, during real manufacturing operations, by getting transport orders from the order generator 202 and by forwarding them to the relevant AGV vehicles 221 to perform the assigned transport tasks on the plant carpet.

The OG orders received by an AGV system during manufacturing operations are typically based on the current runtime plant floor needs.

However, in real industrial scenarios, several uncertain and unplanned events may occur. Such uncertain and unplanned events may cause the AGV fleet managers to be forced to take at runtime non-optimal routing decisions by allocating AGV vehicles in faraway locations.

In general, it is noted that—in cases of manufacturing robotic plants with AGV vehicles—the plant operation processes have more degrees of freedom and/or uncertainties than in cases of traditional manufacturing robotic plants without AGV vehicles. In fact, in regular production robotic cells, the control and the kinematic trajectories of industrial robots were typically definable and modellable upfront. Instead, with AGV systems, a given AGV transport task is not assigned upfront to a specific AGV vehicle. Typically, the fleet manager selects the specific AGV vehicle for executing an assigned task in an autonomous manner based on its own routing algorithm.

In addition to the fact that AGV systems are "autonomous" by definition, the routing decisions of AGV fleet managers become even less predictable and less efficient in case of unplanned events at the shopfloors. Examples of unplanned events at the shopfloors include, but are not limited by, uncertain and natural distributions of unplanned events, provisioning schedules and scenarios e.g. unplanned truck arrival/departure times for deliveries and collections, blockage of a vehicle due to a sudden opening of a door, other examples of non-deterministic events, etc.

Hence, unfortunately, given that, during plant operations, the AGV fleet managers 201 take their decisions based on currently received orders from the order generators 202, without seeing the full picture and without having a look-ahead vision of the plant, the AGV fleets are at risk to be allocated in non-efficient manners on the carpet floor.

Such efficiency issues become even more compelling when various AGV fleet managers, sometimes of different vendors, are operating independently and in parallel on the same plant floor.

Improved techniques for allocating an AGV vehicle in a plant location are therefore desirable.

SUMMARY OF THE INVENTION

Various disclosed embodiments include methods, systems, and computer readable mediums for allocating an AGV vehicle in a location of a plant, wherein a fleet of AGV vehicles is managed by a fleet manager; wherein the fleet manager is configured to receive a transport order by an order generator and is configured to send a corresponding transport request to a selected AGV vehicle; wherein the order generator is configured to send a transport order to the fleet manager upon satisfaction of conditional statements of logical rules, wherein the conditional statements comprise sets of plant status conditions. The method includes enabling the order generator to be configured with an anticipating logical rule whose conditional statement comprises a set of anticipating plant status conditions whose fulfillment causes the order generator to send to the fleet manager a corresponding AGV dummy transport order; wherein the AGV dummy transport order requests an allocation of an AGV vehicle, in a busy state, in a plant location until a set of corresponding anticipated conditions are satisfied or until a predefined timer expires. The method further includes, by the order generator, upon fulfillment of a specific set of anticipating plant status conditions, sending to the fleet manager a corresponding specific AGV dummy transport order. The method further includes, by the fleet manager, requesting the allocation of a selected AGV vehicle in the specific plant location. The method further includes, by the selected AGV vehicle, remaining, in a busy state, allocated in the specific plant location until a set of corresponding specific anticipated conditions are satisfied or until a predefined specific timer expires.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 8 illustrates a flowchart for allocating an AGV vehicle in a plant location in accordance with disclosed embodiments.

DETAILED DESCRIPTION OF THE INVENTION

Figure 1:
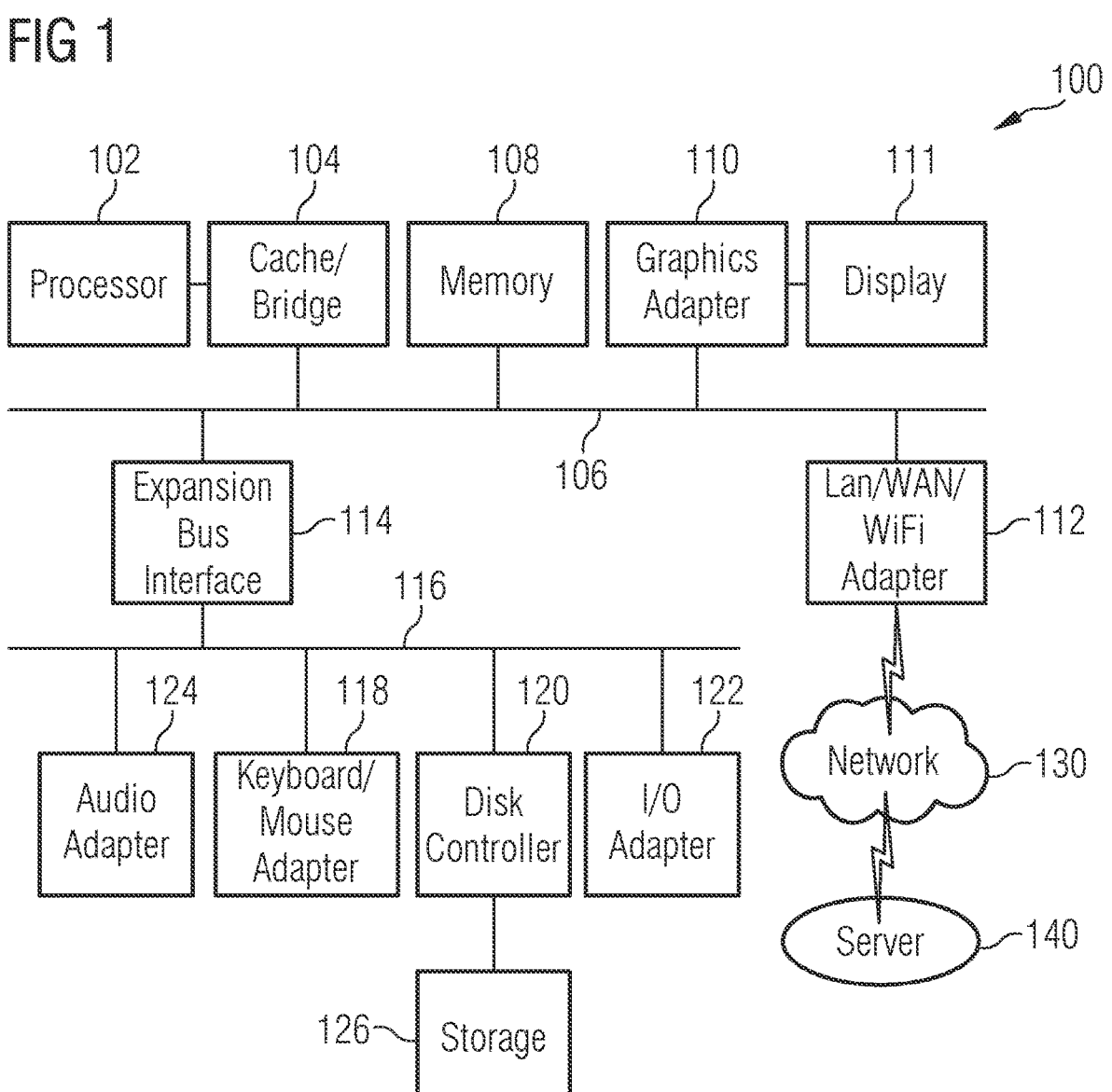
FIG. 1 illustrates a block diagram of a data processing system in which an embodiment can be implemented.
Figure 2:
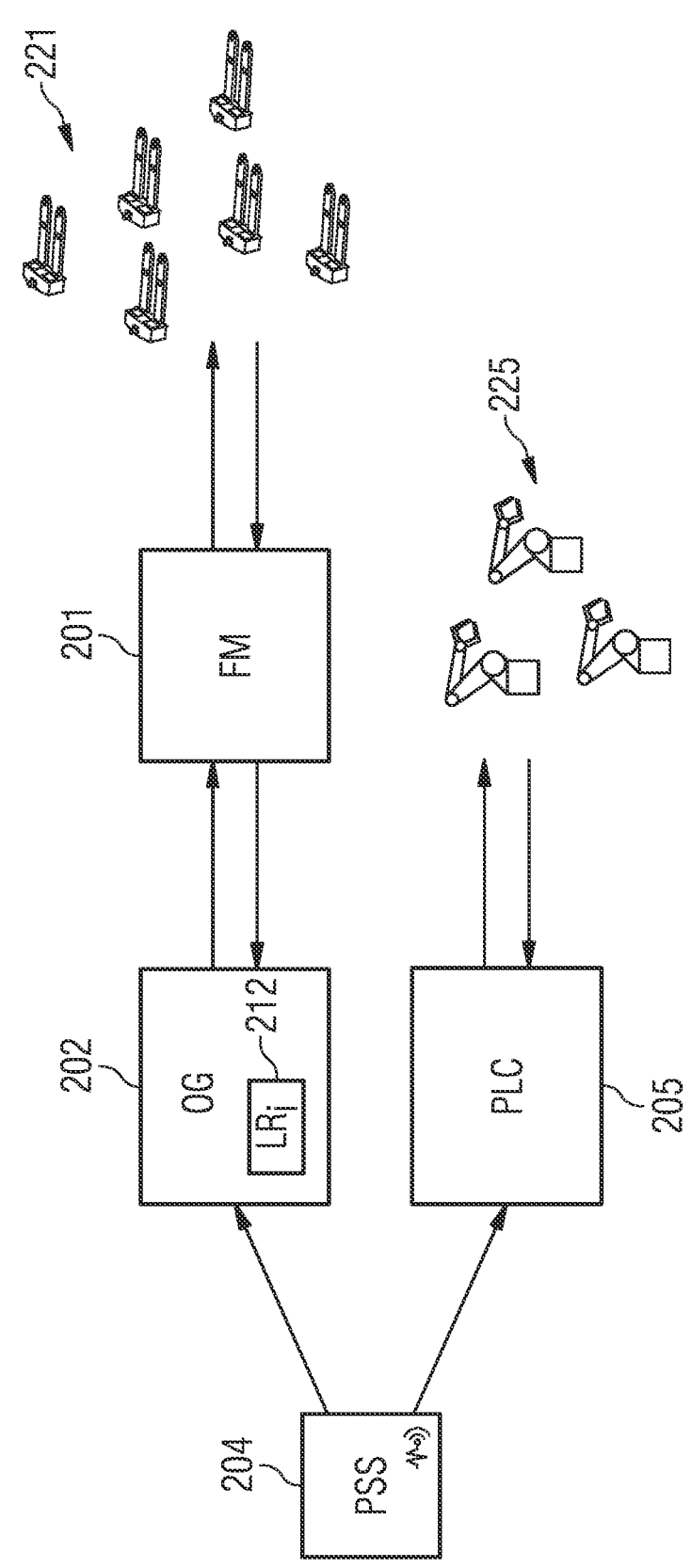
FIG. 2 schematically illustrates a simplified block diagram of modules for managing the movements of AGV vehicles and the movements of industrial robots in a real plant floor.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

As used herein the term "dummy" order/task denotes a "placeholder" order/task, as known in the field of computing, for reserving a space for a real order/task for later usage.

Previous techniques for allocating an AGV vehicle in a plant location were at risk of being inefficient. The embodiments disclosed herein provide numerous technical benefits, including but not limited to the following examples.

Embodiments enable efficient allocation of AGV vehicles in a location in a proximity of a working area in a plant floor.

Embodiments enable the fleet manager to make smarter decisions regarding AGV fleet allocation during manufacturing operations of a plant floor.

Embodiment increases the efficiency of the plant operations given that AGV logistical tasks and manufacturing operations are tightly interconnected. Moreover, it is noted that, in embodiments, AGV vehicles may be advantageously used to move industrial robots between selected working area locations.

Embodiment may reduce bottlenecks of plant operations.

Embodiments may improve plant cycle times.

Embodiments enable an optimization of AGV allocation so that AGV vehicle redundancies are avoided and a minimal number of AGV vehicles are needed during plant operations.

Embodiments enable smart usage of VC simulation information relating to the specific AGV systems deployed on a specific plant floor.

Embodiments make use of VC simulation and are especially beneficial to manufacturers whose production operations have a high level of automation complexity.

Embodiments enable a smart dispatching of AGV vehicles based on manufacturing operation patterns recognized in the outcome data of a VC simulation.

Embodiments enable to handle manufacturing uncertainties of manufacturing robotic plants with AGVs by taking into account both deterministic and non-deterministic scenario inclusive of kinematic behavior.

Embodiments minimizes debugging efforts of AGV deployment engineers at the shop-floor.

Embodiments enable efficient AGV allocation in plant floors where more than one AGV fleets—with their respective fleet managers—are acting in parallel.

Embodiments enable the generation of AGV anticipating logical rules which optimize AGV tasks in a specific manufacturing operation of a specific plant floor.

Embodiments enable the generation of anticipating logical rules for a specific plant thanks to a VC platform simulating the specific plant.

Embodiments enable the generation of anticipating plant status conditions which predict AGV tasks based on plant sensors, plant signals and/or executed plant activities. Advantageously, such "sensor/signal/activity" based prediction might be independent from a "time" based prediction.

Embodiments enable dummy orders covering multiple locations so that a reduced number of AGV vehicles are kept busy for covering the same working areas.

Embodiments enable to allocate, during operations, a set of AGV vehicles in a set of convenient locations ready to perform a set of real AGV transport tasks.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hardcoded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft created in accordance with the present disclosure as described.

Figure 3:
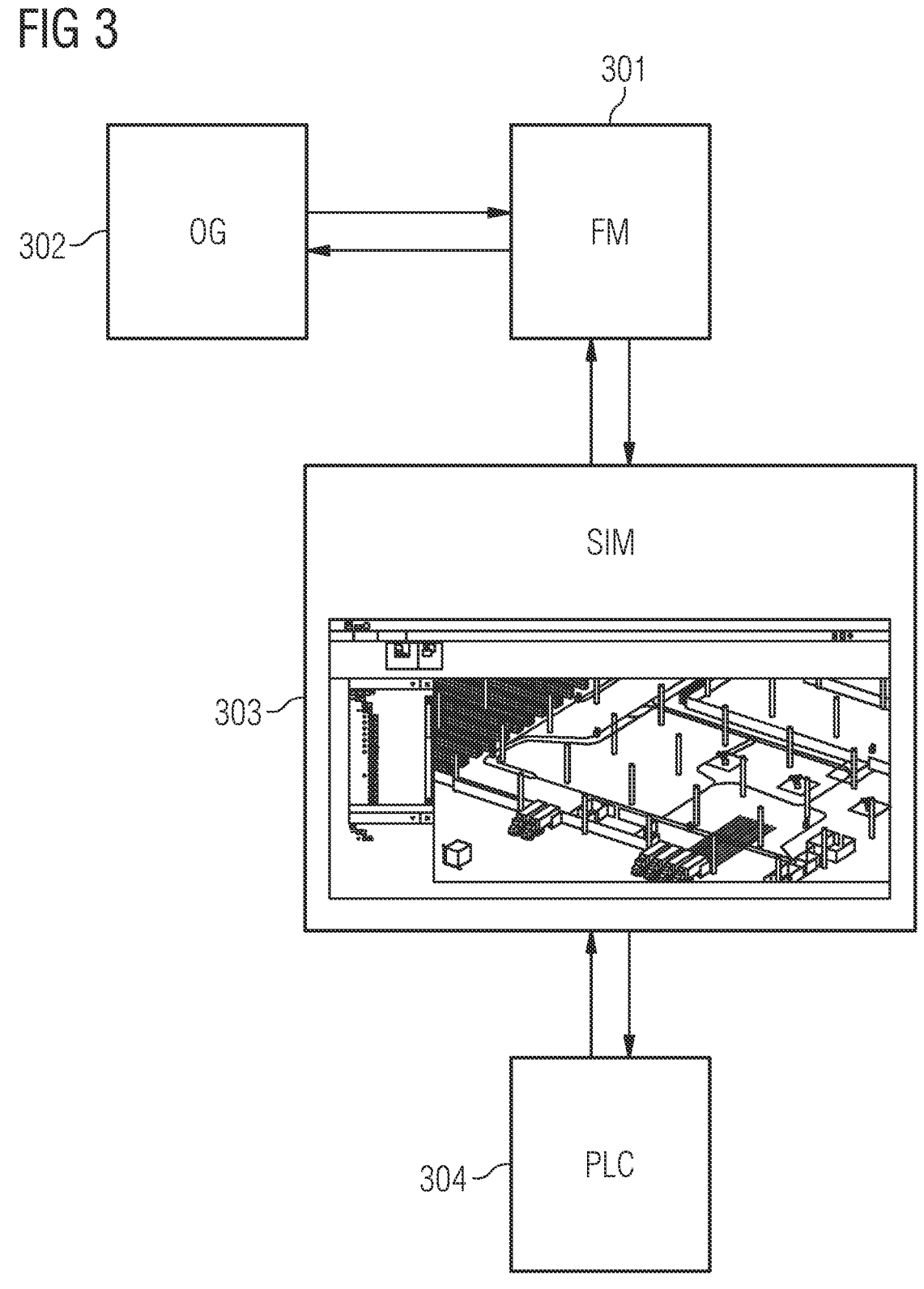
FIG. 3 schematically illustrates a block diagram of a realistic AGV simulation system.
Figure 4:
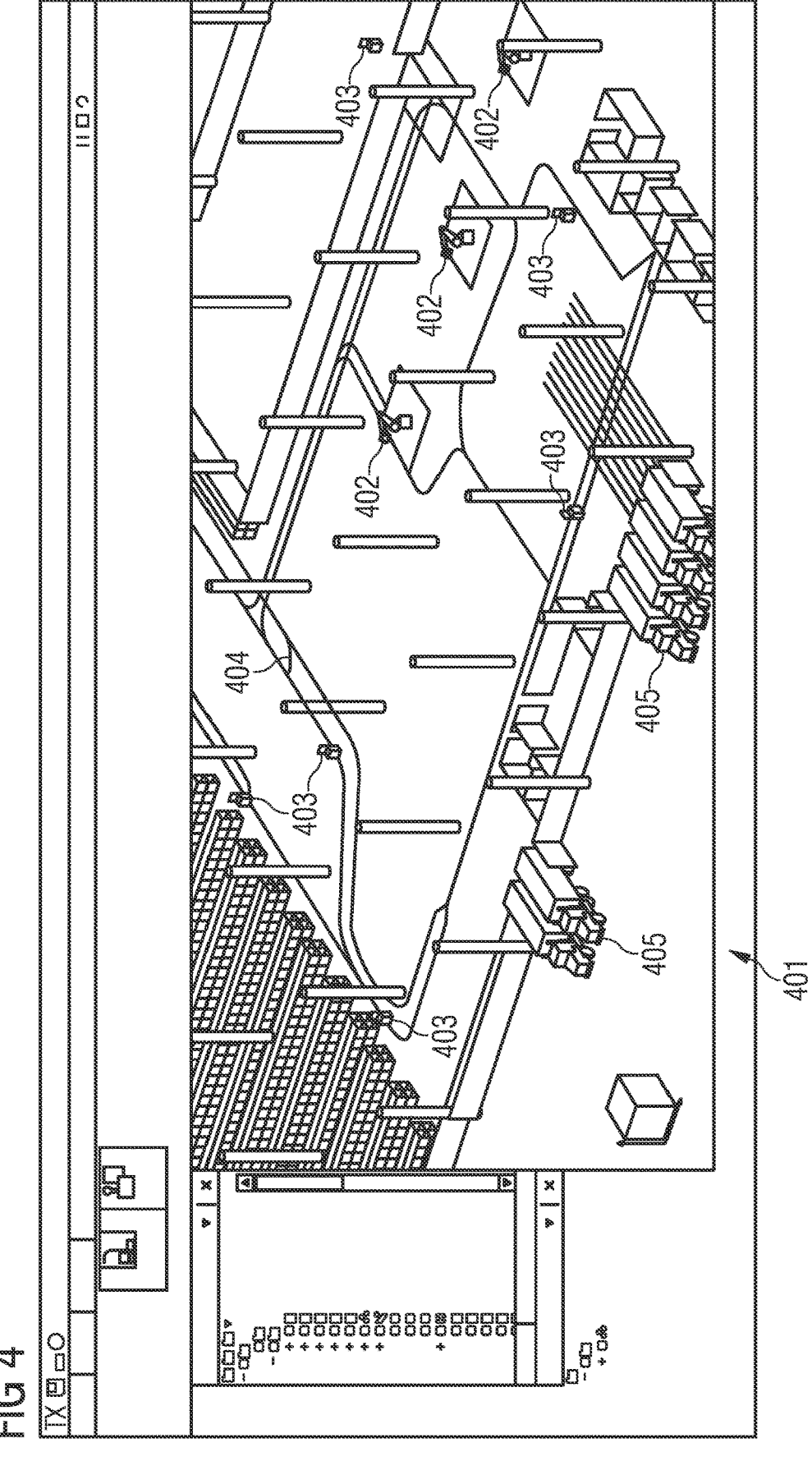
FIG. 4 schematically illustrates an exemplary GUI screenshot of a virtual plant in a simulator.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. FIG. 3 schematically illustrates a block diagram for training a function with a ML algorithm for modeling a false error detector in accordance with disclosed embodiments.

Figure 5:
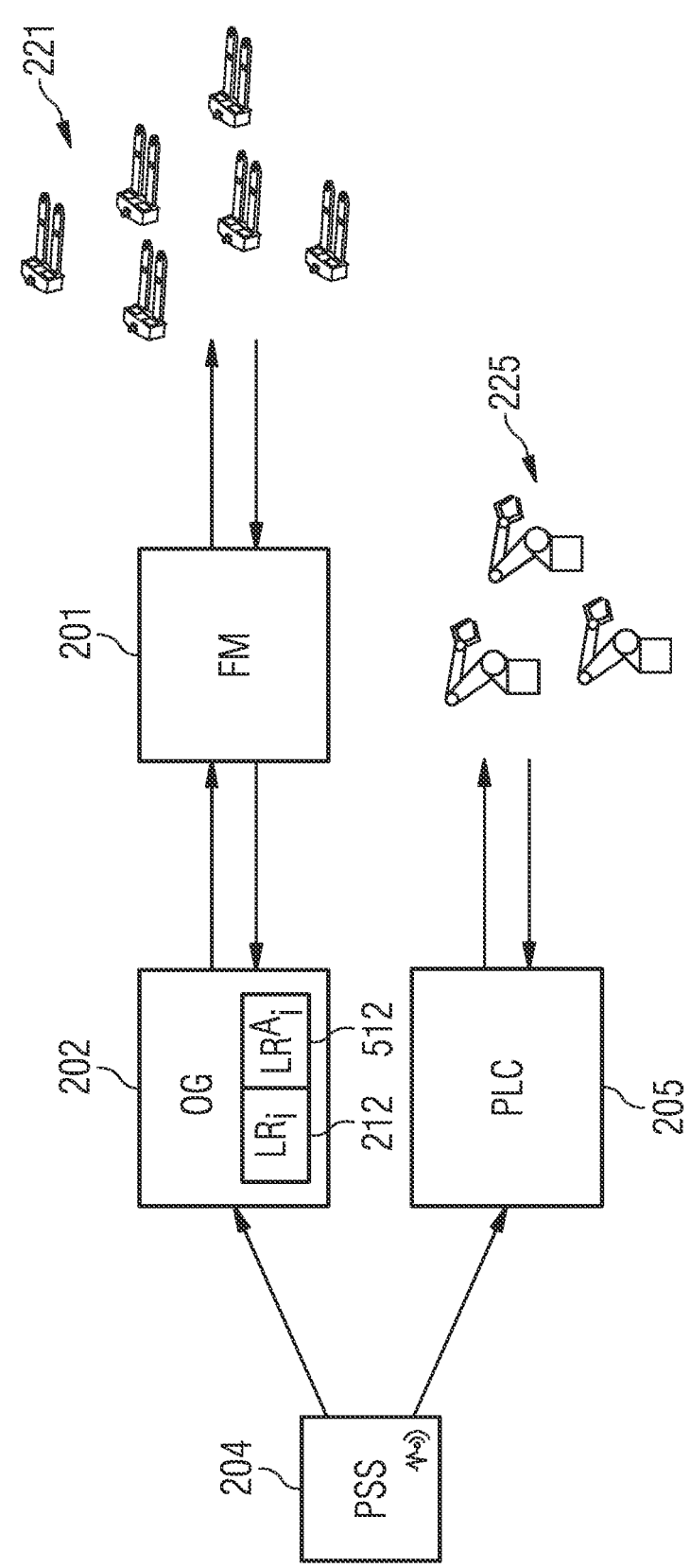
FIG. 5 schematically illustrates a simplified block diagram of modules for managing the movements of AGV vehicles in accordance with disclosed embodiments.

FIG. 5 schematically illustrates a simplified block diagram of modules for managing the movements of AGV vehicles in accordance with disclosed embodiments.

In embodiments, the order generator comprises—as known in prior art techniques—logical rules $LR_i$ 212 for sending AGV transport orders whereby the conditional statements of the logical rules 212 comprise plant status conditions.

Simplified AGV logical rules examples are disclosed below.

```
- LR_10: If (Signal230==true && signal350>10 && signal30<10) send Task10
- LR_11: If (Signal650==false && signal270>10 && signal70<7) send Task11
```

In embodiments, the fleet manager 201 may comprise information on the task list, e.g. what to do in Task10 and Task11 as the below examples disclose.

```
- Task10: fetch from station 101 and deliver to station 105
- Task11: fetch from station 111 and deliver to station 114
```

In some exemplary cases, the OG holds, for each logical rule $LR_1, \ldots, LR_N$, a list of tasks of $Task_1, \ldots, Task_N$ without their definition and the FM holds for each task a corresponding AGV task definition so that the OG needs to hold only the AGV logical rules $LR_1, \ldots, LR_N$. In some other exemplary cases, the OG holds the task definition and the FM holds the source/target list.

Exemplary cases of how tasks can be held by the OG and by the FM are disclosed below.

```
//Exemplary Case I
//OG:
    LR1: if<condition1> do Task1
    LR2: if<condition2> do Task2
//FM:
    Task1 = go to pos A, take the "parts" into pos X
    Task2 = go to pos B, take the "parts" into posY
//Exemplary Case I
//OG:
    if <condition1> do < source: go to pos A, target: take the "parts" into pos X>
    if <condition2> do < source: go to pos B, target: take the "parts" into pos Y>
//FM:
    source list:
        Pos A
        Pos B
    target list:
        Pos X
        Pos Y
```

Corporation located in Redmond, Wash. may be employed if suitably modified. The operating system is modified or In embodiments, the order generator 202 is configured with additional logical rules 512, herein called anticipating logical rules $LR^A_i$. These anticipating logical rules have conditional statements on anticipating plant status conditions which, in cause of fulfillment, cause the order generator 202 to send, to the fleet manager 201, dummy AGV transport orders in a plant location which is preferably chosen to be in the proximity of a set of working areas.

In embodiments, examples of anticipating logical $LR^A_i$ rules are disclosed below.

---

$LR^A_1$: if<anticipating condition1> send <dummy_task1>
$LR^A_2$: if<anticipating condition2> send <dummy_task2>
dummy_task1: busy around location C
dummy_task2: busy around location D

---

In embodiments, the AGV dummy transport orders request an allocation of an AGV vehicle 221, in a busy state, in a proximity of a given working area location, e.g. around location C or D, until a set of corresponding anticipated conditions are satisfied or, alternatively, until a predefined timer expires.

For example, an anticipated condition for dummy task dummy_task1 is the arrival, at the fleet manager 201, of a new order containing transport orders in a plant location e.g. in the proximity of the given working area, e.g. an order that contains a transport order to be executed in the proximity of location C, a go to position C transport order.

In embodiments, the selected AGV vehicle to perform the dummy task is marked as "busy". In embodiments, the selected AGV vehicle performing the dummy task is doing no transport task and is in a "waiting" mode—e.g. moving or still—in the proximity of a desired location.

In exemplary embodiments, the anticipated order of moving parts from location X to location Y usually arrives after the anticipating conditions of the anticipated logical rule exemplified below.

---

If <Parts#_in_X>4 && Parts#_in_Y<5 & & Parts#_in_Z=0 && signal301=true && signal201=true> send <dummy_task__X>

---

In embodiments, exemplary simplified conditions of how dummy orders and dummy tasks can be held by the OG and by the FM are disclosed below.

---

```
//OG:
    LR1: if<conditionA> do dummy_taskA
    LR2: if<conditionB> do dummy_taskB
//FM:
        dummy_taskA= go to pos A, wait there
        dummy_taskB= go to pos B, wait there
```

---

In embodiments, exemplary simplified conditions for ending dummy tasks of the AGV vehicles are disclosed below.

---

W = (new order comprising <go to position C> arrives at the FM) OR (timer greater than 5 sec);
Dummy_task for the selected AGV: <go to position C, wait there until W> OR <wait at your position until W>
//e.g. the latter may occur if the selected AGV is already in a convenient location for covering C
if <W is TRUE>, <FM releases the selected AGV due to timer expiration> OR <FM assigns, to the selected AGV, the real AGV task based on the real arrived OG transport order to be performed in position C>.

---

As used herein, in embodiments, the "locations" may denote "area locations" preferably situated in the proximity of working areas, for example whereby some plant operations are to be executed.

In embodiments, the plant carpet may be grouped in several predefined locations; each predefined location may represent a convenient waiting area for an AGV vehicle in a dummy task waiting to be assigned to a real AGV task covering a set of corresponding predefined working area locations.

In embodiments, a single AGV dummy task covers one location of a working area so that, for multiple locations, multiple dummy tasks are preferably needed. In other embodiments, a single AGV dummy task covers multiple locations. In other embodiments, a single dummy task in a conveniently pre-determined plant location may be used to cover the arrival of several anticipated AGV orders in a set of multiple locations coverable from the pre-determined plant location so that, advantageously, only one dummy task is needed.

For example, with embodiments, assume three AGV dummy tasks, e.g. dummy_task1, dummy_task2, dummy_task3 are generated for three corresponding multiple working area locations L1, L2, L3. With other embodiments, in another exemplary case, a single AGV dummy task dummy_tasky, instead of three different dummy tasks, may conveniently cover the three different working area locations L1, L2, L3. In this exemplary case, the fleet manager may get a dummy order for a multi-location dummy_tasky covering three locations L1, L2, L3. In this exemplary case, upon reception of the multi-location dummy task, the selected AGV is sent to a location $L_M$, whereby location $L_M$ is determined at a waiting location convenient for covering the multiple locations L1, L2, L3. Therefore, when the fleet manager gets the dummy AGV order dummy_task$_M$, it sends one selected AGV vehicle to location La to wait in a busy state, until one of the following four situations occurs: timer is off; it arrives AGV order "go to pos L1"; it arrives AGV order "go to pos L2" it arrives AGV order "go to pos L3".

Advantageously, with embodiments, with dummy orders covering multiple locations, a reduced number of AGV vehicles are kept busy for covering the same working areas.

With prior art techniques, the order generator typically holds N logical rules $LR_j$, e.g. user defined rules like "if <condition> send <order>" and the fleet manager holds N corresponding transport task definitions and/or source/target position definitions.

With embodiments, the order generator conveniently holds M additional anticipating logical rules $LR^A_i$, e.g. like "if <anticipating condition> send <dummy order>" and the fleet manager holds M corresponding additional tasks, e.g. like "keep busy around <target>".

With embodiments, in case of an order generator is interfacing with a plurality of fleet managers, the N+M logical rules of the order generator may correspond to different shares of AGV transport tasks of the plurality of fleet managers. For example, in case there are two fleet managers $FM_1$ and $FM_2$, e.g. of the same or of two different vendors, the order generator holds 60 logical rules, whereby the first fleet manager $FM_1$ holds 50 transport tasks and the second fleet manager $FM_2$ holds 10 transport tasks.

Figure 6A:
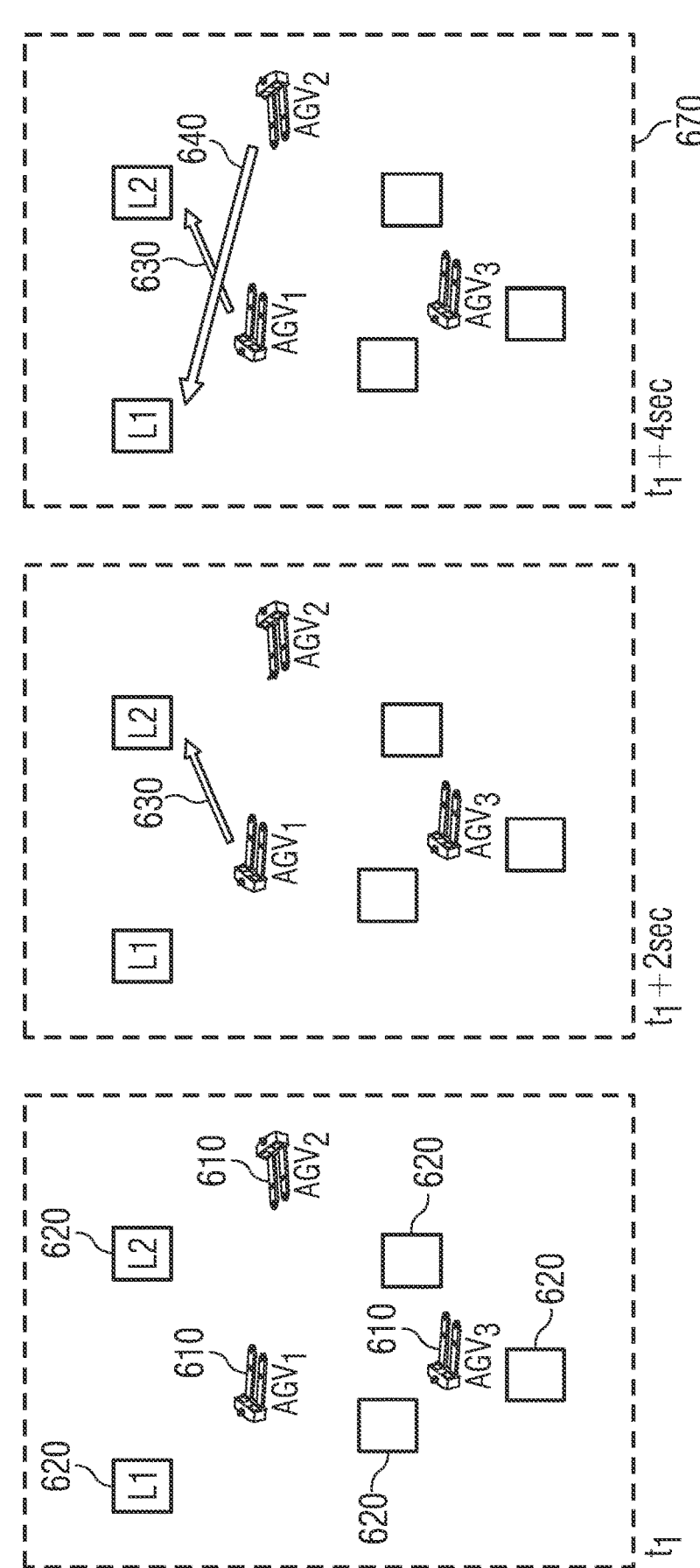
FIGS. 6A, 6B schematically illustrate a simplified exemplary scenario of AGV efficient allocation in a proximity of a working area in accordance with disclosed embodiments.
Figure 6B:
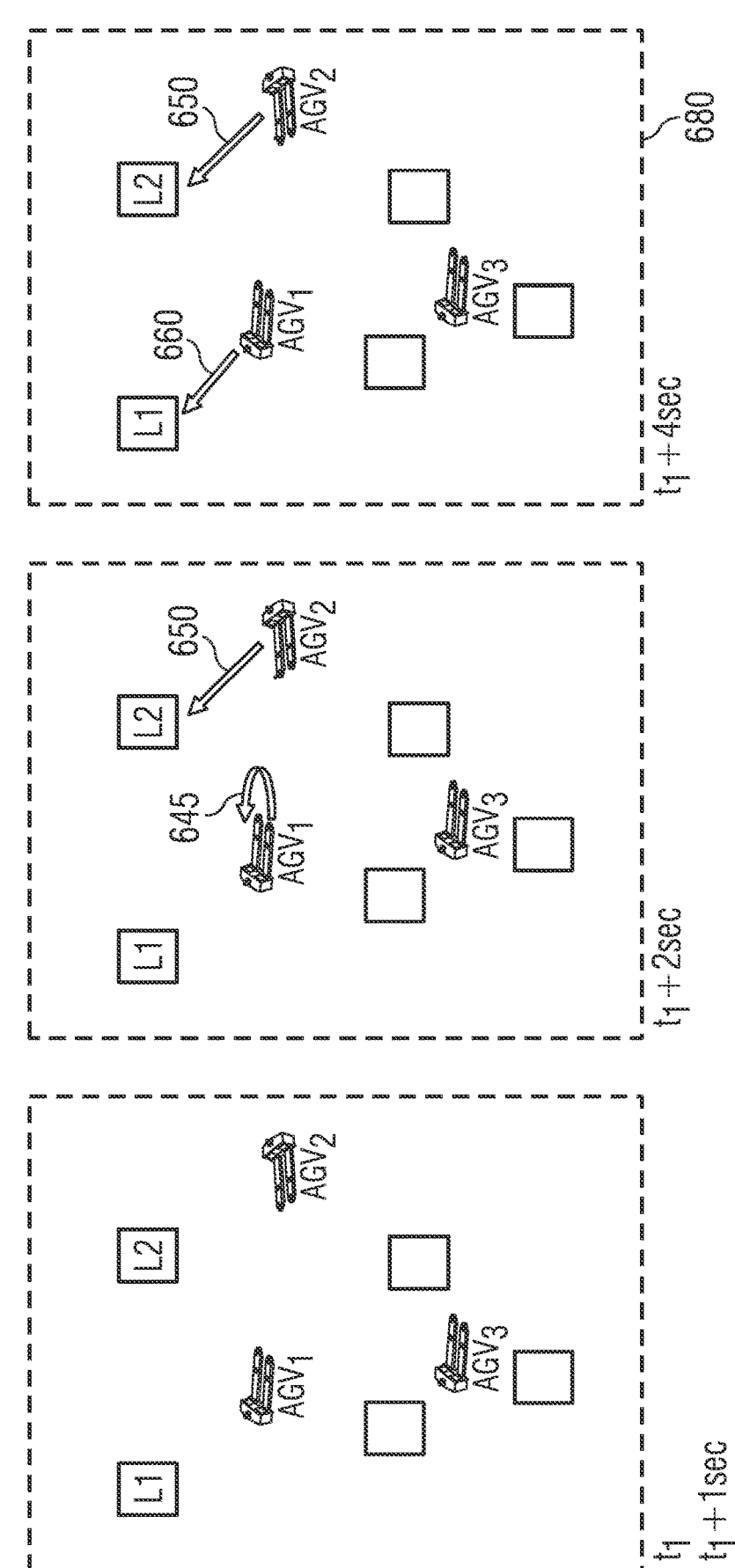

FIGS. 6A, 6B schematically illustrate a simplified exemplary scenario of AGV efficient allocation in a proximity of a working area in accordance with disclosed embodiments.

FIG. 6A schematically illustrates a simplified example of inefficient AGV allocation in the prior art, whose timeline is shown in Table 1 below.

At time t1, three AGV vehicles 610 are on the carpet shopfloor where five working area locations 620 are illustrated. The two vehicles AGV1, AGV2 are free to get transport task requests.

After two seconds, at time t1+2 sec, the fleet manager receives a transport order R1 to send one AGV vehicle to working area location L2, to perform an AGV transport order, e.g. "fetch" ready parts from one specific station in area L2 and "deliver" them to a given station in another area. The fleet manager, after computing its routing algorithm also based on location information received from the two free vehicles AGV1, AGV2, assigns the corresponding transport request to vehicle AGV1 which then is accordingly moving 630 to location L2 in order to perform its assigned request R1.

After another two seconds, at time t1+4 sec, the fleet manager receives a new transport order R2 to send one AGV vehicle to working area L1 to perform another AGV transport order, e.g. "fetch" ready parts from one specific station in area L1 and "deliver" to a given station in another area. The fleet manager, after computing its routing algorithm also based on location information received from the free vehicle AGV2, assigns the corresponding transport request to vehicle AGV2 which then is accordingly moving 640 to location L1 in order to perform its assigned request.

TABLE 1

| | timeline of FIG. 6A | | |
|---|---|---|---|
| time = $t_1$ | time = $t_1$ + 2 sec | time = $t_1$ + 4 sec | |
| AGV1 is free | transport order R1 <AGV to L2> | transport order R2 <AGV to L1> | |
| AGV2 is free | AGV1 performs R1 | AGV1 is performing R1 | |
| | AGV2 is free | AGV2 performs R2 | |

FIG. 6B schematically illustrates a corresponding simplified example of efficient AGV allocation in accordance with disclosed embodiment, whose timeline is shown in Table 2 below.

At time t1, three AGV vehicles 610 area on the carpet shopfloor where five working areas 620 are illustrated. The two vehicles AGV1, AGV2 are free to get transport task requests.

With embodiments, after one second, at time t1+1 sec, at a preceding time point in accordance with anticipating conditions, the fleet manager receives a dummy transport order DO to allocate one AGV vehicle in a convenient location e.g. in the proximity of working area L1 until an anticipated condition will be fulfilled, i.e. order in this working area L1 arrives, or until a timer expires. The fleet manager, after computing its routing algorithm also based on location information received from the two free vehicles AGV1, AGV2, assigns the corresponding dummy request to vehicle AGV1 which then remains in a busy state 645 around working area L1.

After another one second, at time t1+2 sec, the fleet manager receives a transport order R1 to send one AGV vehicle to working area L2 to perform an AGV transport order, e.g. "fetch" ready parts from one specific station in area L2 and "deliver" to a given station in another area. The fleet manager, after computing its routing algorithm also based on location information received from the free vehicle AGV2, since vehicle AGV1 is busy 645 with its dummy task, assigns the corresponding transport request to vehicle AGV2 which then is accordingly moving 650 to location L2 in order to perform its corresponding assigned transport request.

After another two seconds, at time t1+4 sec, the anticipated condition of the dummy order D0 is fulfilled, and the fleet manager receives an anticipated order order R2 to send one AGV vehicle to working area L1 to perform the anticipated AGV transport order, e.g. "fetch" ready parts from one specific station in area L1 and "deliver" to a given station in another area. In embodiments, the fleet manager, given that the anticipated condition is fulfilled, assigns the corresponding transport request R2 to vehicle AGV1 which was busy in the proximity of location L1 then is accordingly moving 660 to location L1 in order to perform its assigned request.

TABLE 2

| | timeline of FIG. 6B | | |
|---|---|---|---|
| time = $t_1$ | time = $t_1$ + 1 sec | time = $t_1$ + 2 sec | time = $t_1$ + 4 sec |
| AGV1 is free | dummy order D0 <AGV to L2> | order R1 <AGV to L2> | order R2 <AGV to area L1> |
| AGV2 is free | AGV1 is busy around L2 | AGV1 is busy around L1 | AGV1 performs R2 AGV2 is |
| | AGV2 is free | AGV2 performs R1 | performing R1 |

Advantageously, with embodiments, the AGV allocation scenario 680 of FIG. 6B is more efficient than the AGV allocation prior art scenario 670 of FIG. 6A. As seen in 680, vehicle AGV1 conveniently performs a transport order in a closer location L1 and vehicle AGV2 performs a transport order in a closer location L2 whilst in 670 AGV1 performs a transport order in a further location L2 and vehicle AGV2 performs a transport order in a further location L1.

Exemplary Algorithms of Embodiments for Determining Anticipating Logical Rules

Figure 7:
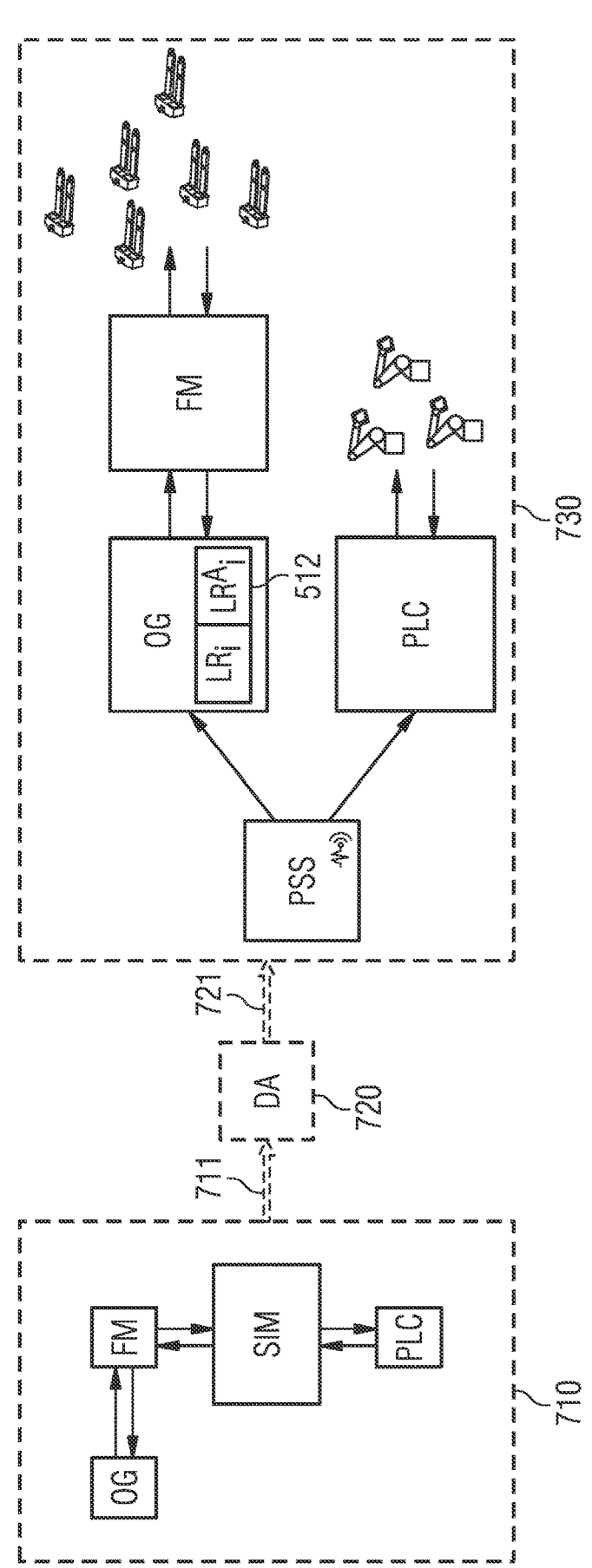
FIG. 7 schematically illustrates embodiments for determining anticipating plant status conditions and corresponding anticipating logical rules in accordance with disclosed embodiments.

FIG. 7 schematically illustrates embodiments for determining anticipating plant status conditions and corresponding anticipating logical rules in accordance with disclosed embodiments.

Exemplary embodiments comprise the following three main phases:

Phase1: collecting 711 relevant data from a plant simulation;

Phase2: analyzing 720 data via pattern recognition and generating 720 of anticipating logical rules;

Phase3: sending 721 the anticipating logical rules to the order generator of the plant.

In embodiments of the first phase, relevant simulation outcome data are collected 711 by executing a virtual simulation 710 of full plant operations. In embodiments, a full digital simulation includes modules like order generator, fleet manager, PLC and simulator. In embodiments, one or more VC simulation are executed with all plant entities, modules, pieces of equipment, like e.g. industrial robots, PLCs, robotic programs, conveyors, signals, sensors, AGV vehicles, AGV fleet managers, order generators etc.

In embodiments, during the plant simulation, one or more of the following data sets may be collected:

transport orders sent by the OG to each of the FMs to each AGV vehicles signals and sensor states before such transport orders are sent;

robotic tasks preceding such transport orders and their corresponding duration times;

number of parts moved on each conveyor and their types;

number of robotic operations, their types and corresponding robots;

employed times of each AGV vehicle for reaching its target position;

status situations in precedent and subsequent workstations;

human tasks;

other relevant plant statuses.

Advantageously, a large and a rich variety of plant status condition data can be extracted as outcome of the simulated virtual plant environments.

In embodiments of the second phase, the gathered simulation outcome data are collected 711 for recognizing recurring patterns by a simulation outcome data analyzer 720.

In embodiments, data are analyzed 720 in order to recognize, via a pattern recognition algorithm, repetitive AGV order patterns with recurring AGV transport orders, herein called anticipated conditions, and corresponding recurring anticipating plant status conditions which precede such AGV order patterns.

In embodiments, via a pattern recognition algorithm, one searches repetitive OG patterns and repetitive plant status patterns pointing on their corresponding OG patterns. The searched repetitive plant status pattern take place before the OG sends corresponding transport orders.

In embodiments, such recurring anticipating plant status conditions occur before their corresponding anticipated transport orders requesting AGV tasks to be performed in specific plant working areas.

As outcome, a set of anticipating plant status conditions are determined, whereby such anticipating plant status conditions precede a subset of anticipated OG's transport orders before they arrive.

Based on the determined anticipating plant status conditions, additional rules with dummy tasks, herein called anticipating logical rules $LR^A_i$ are generated.

Examples of recognized patterns and corresponding generated anticipating logical rules $LR^A_i$ are disclosed below.

Anticipating plant status conditions $C^A_{X1-X5}$, $C^A_{X6-X7}$, $C^A_{X8}$, $C^A_{X9-X15}$, $C^A_{X8}$ are recognized to precede anticipated conditions, e.g. like for example arrivals of AGV transport orders to areas A, B, C, D, E for performing respective AGV tasks T1-T5, T6-T7, T8, T9-T15, T16.

If ($C^A_{X1-X5}$), send an AGV to area A—busy until arrival of tasks (T1-T5) or timer expires.

If ($C^A_{X6-X7}$), send an AGV to area B—busy until arrival of tasks (T6-T7) or timer expires.

If ($C^A_{X8}$), send an AGV to area C—busy until arrival of task (T8) or timer expires.

If ($C^A_{X9-X15}$), send an AGV to area D—busy until arrival of tasks (T9-T15) or timer expires.

If ($C^A_{X16}$), send an AGV to area E—busy until arrival of tasks (T16) or timer expires.

The selected AGV for getting the dummy call comes to the assigned area and is considered "as busy AGV", not able of getting other tasks, until it gets the predicted requested task or until a certain timer has expired.

In embodiments, the AGV vehicle is kept busy in a convenient location until arrives any task requesting an AGV in a needed location which can be covered by this convenient location.

Example of a plant status condition and respective anticipated condition includes a number P of ready parts in position X (e.g. measured by the area sensors) and reception of AGV transport order of sending an AGV vehicle to perform the actions of fetching the P ready parts from source position X and of delivering them to a target position Y. An example of an anticipating plant status condition is then there are "P-2" ready parts in position X. Example of anticipating logical rule is send a dummy AGV transport order to position X when there are "P-2" ready parts in position X.

Advantageously, with embodiments, an AGV is allocated into a convenient position in a waiting mode and does not drive to a faraway location.

In embodiments, the anticipating condition may preferably be picked at a status plant condition occurring at a time interval smaller than the predefined timer, e.g. if the predefined timer is set at eight seconds and if the anticipated status condition repetitively occurs at sensor measuring five parts and the sensor measuring three parts usually occurs more than eight seconds before the sensor measures five parts than the anticipating status condition of the dummy task is preferably be picked at sensor measuring four parts which is usually happening at six seconds before the sensor measuring five parts.

In embodiments for more complex conditions, combinations of anticipating status conditions may preferably be picked or any other heuristic conditions as shown in the below example.

For example, assume a scenario where in the simulation data the AGV task is requested in the following parts pairs $(P_S; P_T)$=(number of detected parts in the source; number of detected parts in the target):

(5; 7), (5; 8), (5; 8), (5; 8), (5; 8), (5; 8), (5; 7), (5; 7), (5; 7), (5; 8), (6; 7), (5; 8), (5; 8), (5; 8), (5; 8), (5; 8), (5; 8), (5; 8), (5; 8). The recurring part pair is (5; 8) and the anticipating condition can be picked as (4, 8) OR (5, 7) or any other heuristic rule.

Those skilled in the art know that there are a large variety of pattern recognition algorithms which can be utilized for finding recurring AGV transport order patterns in a simulated plant environment in accordance with embodiments.

Examples of pattern recognition algorithms, include but are not limited by, techniques listed in the "Pattern recognition" Wikipedia page like, e.g., classification techniques, clustering techniques, ensemble learning algorithms, regression methods etc.

As defined in the "Pattern recognition" Wikipedia page, "the field of pattern recognition is concerned with the automatic discovery of regularities in data through the use of computer algorithms and with the use of these regularities to take actions such as classifying the data into different categories".

In embodiments, the recurring AGV patterns in the simulated environment can be discovered in a non-automated manner, i.e. in a manual manner by a human operator. Therefore, in embodiments, pattern recognition techniques may be performed by a human operator, by a computer system or any combination thereof.

In embodiments, the predefined timer expiration value may be set to a value which is generic for all AGV tasks or to a specific value per specific set of AGV tasks.

In embodiments, the timer expiration control is preferably managed by the fleet manager, which is usually the module giving a busy order to a specific AGV vehicle and marking this specific AGV vehicle as busy in its AGV fleet list.

In other embodiments, the timer expiration control may be in managed by other components, for example by the order generator or by the AGV vehicle itself.

In embodiments of the third phase, the generated anticipating logical rules $LR^A_i$ are sent 721 to the order generator module. In embodiments, such anticipating logical rules comprise anticipating conditions which, when fulfilled, cause the order generator to send dummy AGV transport orders to the fleet manager module.

In embodiments, the anticipating logical rules $R^A_i$ are added into the order lists of the OG module and corresponding dummy tasks may be added into the FM module.

In embodiments, each anticipating logical rules $R^A_i$ comprises an anticipating condition and a corresponding dummy order in the proximity of a working area L, that when the anticipating condition is fulfilled, the order generator sends the corresponding dummy transport order to the fleet manager which in turns selects a specific AGV vehicle to be allocated in a waiting or busy mode around working area L.

In other words, embodiments of the three-phase flow may comprise: executing a plant simulation, exporting simulation outcome data, analyzing the exported data, extracting recurring plant operation patterns and determining relevant anticipating logical rules, sending the anticipating logical rules with corresponding dummy orders into the order generator which will then result into corresponding AGV tasks computed by the fleet manager during plant operations.

In embodiments, the simulation outcome data analyzer 720 can be placed inside block 710, either inside or outside the simulator 303.

In embodiments, the data analyzer externally receives outcome data from the simulator 303.

In embodiments, the data analyzer 720 is configured to send, at runtime during plant operations, updated anticipating logical rules to the order generator 202.

In embodiments, the anticipating logical rules might be deleted and/or replaced with updated/fine-tuned anticipating logical rules. For example, if during operations, the timer of a given logical rule expires too often, this logical rule may be deleted from the order generator. In embodiment, the anticipating logical rules may receive a relevancy score by determining the frequency of timer expiration.

Although exemplary embodiments of architectures have been described in FIGS. 5 and 7, those skilled in the art will understand that various changes, substitutions, variations, and improvements may be made without departing from the scope of the disclosure in its broadest form. In particular it is noted that in embodiments the OG module and the FM module are described as two distinct components. In other embodiments, a single component may combine the OG functionalities and the FM functionalities into one OG-FM module. In other embodiments, a plurality of components implementing the OG and the FM functionalities.

FIG. 8 illustrates a flowchart of a method for allocating system an AGV vehicle in a plant location in accordance with disclosed embodiments. Such method can be performed, for example, by system 100 of FIG. 1 described above, but the "system" in the process below can be any apparatus configured to perform a process as described.

In embodiments, in the plant, a fleet of AGV vehicles is managed by a fleet manager. The fleet manager is configured to receive a transport order by an order generator and is configured to send a corresponding transport request to a selected AGV vehicle. The order generator is configured to send a transport order to the fleet manager upon satisfaction of conditional statements of logical rules, wherein the conditional statements comprise sets of plant status conditions.

At act 805, the order generator is enabled to be configured with an anticipating logical rule whose conditional statement comprises a set of anticipating plant status conditions whose fulfillment causes the order generator to send to the fleet manager a corresponding AGV dummy transport order; wherein the AGV dummy transport order requests an allocation of an AGV vehicle, in a busy state, in a plant location until a set of corresponding anticipated conditions are satisfied or until a predefined timer expires.

At act 810, the order generator sends, upon fulfillment of a specific set of anticipating plant status conditions, to the fleet manager a corresponding specific AGV dummy transport order. In embodiments, the specific set of anticipating plant status condition are a conditional statement of a specific anticipating logical rule.

At act 815, fleet manager requests the allocation of a selected AGV vehicle in the specific plant location. In embodiments, the specific plant location is in the proximity of a working area.

At act 820, the selected AGV vehicle, remains, in a busy state, allocated in the specific plant location until a set of corresponding specific anticipated conditions are satisfied or until a predefined specific timer expires.

In embodiments, the set of anticipating plant status conditions may conveniently be determined by recognizing a pattern of plant status conditions anticipating the occurrence of a pattern of corresponding anticipated conditions on a data set obtained as outcome of an execution of a virtual simulation of the plant operations.

In embodiments, an anticipated condition may preferably be an AGV transport order requesting an AGV vehicle in a specific working area which can be covered by the AGV vehicle allocated in a dummy task at the specific plant location.

In embodiments, a dummy task in a convenient location may be used to cover multiple anticipated conditions linked to the arrivals of a set of AGV orders in a set of multiple locations coverable from the convenient location.

In embodiments, the virtual simulation data set may be selected from the group consisting of: transport orders sent by the OG to each of the FMs to each AGV vehicles; signals and sensor states before such transport orders are sent; robotic tasks preceding such transport orders and their corresponding duration times; number of parts moved on each conveyor and their types; number of robotic operations, their types and corresponding robots; employed times of each AGV vehicle for reaching its target position; status situations in precedent and subsequent workstations; human tasks; and, other relevant plant statuses.

In embodiments, the set of anticipating plant status conditions may be selected from the group consisting of: a set of conditions on plant signals; a set of conditions on plant sensors; a set of conditions on plant statuses; a set of conditions on statuses of any plant equipment or of any plant object or of any human; a set of conditions combining any of the above.

In embodiments, during plant operations, the order generator may receive a new anticipating logical rule.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/ readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for allocating, by a data processing system, an automated guided vehicle (AGV) disposed to a location of a plant, wherein a fleet of AGVs is managed by a fleet manager (FM), wherein the fleet manager is configured to receive a transport order from an order generator (OG) and is configured to send a transport request to a selected AGV, wherein the order generator is configured to send the transport order to the fleet manager upon satisfaction of conditional statements of logical rules, wherein the conditional statements of logical rules include sets of plant status conditions, the method comprises the steps of:

enabling the order generator to be configured with an anticipating logical rule whose conditional statement includes a set of anticipating plant status conditions whose fulfillment causes the order generator to send to the fleet manager a corresponding AGV dummy transport order, wherein the corresponding AGV dummy transport order requests an allocation of the AGV vehicle, in a busy state, to a plant location until a set of corresponding anticipated conditions are satisfied or until a predefined timer expires;

sending to the fleet manager the corresponding AGV dummy transport order via the order generator, upon fulfillment of a specific set of the anticipating plant status conditions;

requesting, via the fleet manager, an allocation of the selected AGV vehicle to a specific plant location;

sending, by the fleet manager, a transport task request to the selected AGV vehicle to send the selected AGV vehicle to the specific plant location; and keeping the selected AGV vehicle in a waiting mode at the specific plant location and marking the selected AGV vehicle as being in the busy state until the set of corresponding anticipated conditions are satisfied or until the predefined specific timer expires;

wherein in the waiting mode, the selected AGV vehicle does not perform a transport task.

2. The method according to claim 1, wherein the set of anticipating plant status conditions are determined by recognizing a pattern of plant status conditions anticipating an occurrence of a pattern of corresponding anticipated conditions on a data set obtained as outcome of an execution of a virtual simulation of plant operations.

3. The method according to claim 1, wherein an anticipated condition is an AGV transport order requesting the AGV vehicle in a specific working area which can be covered by the AGV vehicle allocated in a dummy task at the specific plant location.

4. The method according to claim 3, wherein the dummy task in a given location may be used to cover multiple anticipated conditions linked to arrivals of a set of AGV orders in a set of multiple locations coverable from the given location.

5. The method according to claim 2, wherein the data set of the virtual simulation is selected from the group consisting of:

transport orders sent by the OG to each of the FMs to each of the AGVs;

signals and sensor states before the transport orders are sent;

robotic tasks preceding the transport orders and their corresponding duration times;

a number of parts moved on each conveyor and their types;

a number of robotic operations, their types and corresponding robots;

employed times of each said AGV vehicle for reaching its target position;

status situations in precedent and subsequent workstations;

human tasks; and other relevant plant statuses.

6. The method according to claim 1, wherein the set of anticipating plant status conditions are selected from the group consisting of:

a set of conditions on plant signals;

a set of conditions on plant sensors;

a set of conditions on plant statuses;

a set of conditions on statuses of any plant equipment or of any plant object or of any human; and a set of conditions combining any of the above.

7. The method according to claim 1, wherein, during plant operations, the order generator receives a new anticipating logical rule.

8. A data processing system, comprising:

a processor;

a memory connected to said processor;

the data processing system configured to:

enable an order generator to be configured with an anticipating logical rule whose conditional statement includes a set of anticipating plant status conditions whose fulfillment causes the order generator to send to a fleet manager a corresponding automated guided vehicle (AGV) dummy transport order, wherein the corresponding AGV dummy transport order requests an allocation of an AGV, in a busy state, to a plant location until a set of corresponding anticipated conditions are satisfied or until a predefined timer expires;

enable the order generator to send, upon fulfillment of a specific set of anticipating plant status conditions, to the fleet manager a corresponding specific AGV dummy transport order;

enable the fleet manager to request an allocation of a selected AGV vehicle to a specific plant location;

enable the fleet manager to send a transport task request to the selected AGV vehicle to send the selected AGV vehicle to the specific plant location; and enable the selected AGV vehicle to remain in a waiting mode at the specific plant location and mark the selected AGV vehicle as being in the busy state until the set of corresponding anticipated conditions are satisfied or until the predefined specific timer expires;

wherein in the waiting mode, the selected AGV vehicle does not perform a transport task.

9. The data processing system according to claim 8, wherein the specific set of anticipating plant status conditions are determined by recognizing a pattern of plant status conditions anticipating an occurrence of a pattern of corresponding anticipated conditions on a data set obtained as outcome of an execution of a virtual simulation of plant operations.

10. The data processing system according to claim 8, wherein an anticipated condition is an AGV transport order requesting the AGV vehicle in a specific working area which can be covered by the AGV vehicle allocated in a dummy task at the specific plant location.

11. The data processing system according to claim 10, wherein the dummy task in a given location may be used to cover multiple anticipated conditions linked to arrivals of a set of AGV orders in a set of multiple locations coverable from the given location.

12. The data processing system according to claim 9, wherein the data set of the virtual simulation is selected from the group consisting of:

transport orders sent by the OG to fleet manages for each of the AGVs;

signals and sensor states before the transport orders are sent;

robotic tasks preceding the transport orders and their corresponding duration times;

number of parts moved on each conveyor and their types;

a number of robotic operations, their types and corresponding robots;

employed times of each of the AGV for reaching its target position;

status situations in precedent and subsequent workstations;

human tasks; and other relevant plant statuses.

13. The data processing system according to claim 8, wherein the specific set of anticipating plant status conditions are selected from the group consisting of:

a set of conditions on plant signals;

a set of conditions on plant sensors;

a set of conditions on plant statuses;

a set of conditions on statuses of any plant equipment or of any plant object or of any human; and a set of conditions combining any of the above.

14. A non-transitory computer-readable medium encoded with executable instructions that, when executed, cause at least one data processing system to:

enable an order generator (OG) to be configured with an anticipating logical rule whose conditional statement contains a set of anticipating plant status conditions and whose fulfillment causes the order generator to send to a fleet manager (FM) a corresponding automated guided vehicle (AGV) dummy transport order, wherein the AGV dummy transport order requests an allocation of an AGV vehicle, in a busy state, at a plant location until a set of corresponding anticipated conditions are satisfied or until a predefined timer expires;

enable the order generator to send, upon fulfillment of a specific set of anticipating plant status conditions, to the fleet manager a corresponding specific AGV dummy transport order;

enable the fleet manager to request an allocation of a selected AGV vehicle to a specific plant location;

enable the fleet manager to send a transport task request to the selected AGV vehicle to send the selected AGV vehicle to the specific plant location; and enable the selected AGV vehicle to remain in a waiting mode at the specific plant location and mark the selected AGV vehicle as being in the busy state until the set of corresponding anticipated conditions are satisfied or until the predefined specific timer expires;

wherein in the waiting mode, the selected AGV vehicle does not perform a transport task.

15. The non-transitory computer-readable medium according to claim 14, wherein the specific set of anticipating plant status conditions are determined by recognizing a pattern of plant status conditions anticipating an occurrence of a pattern of corresponding anticipated conditions on a data set obtained as outcome of an execution of a virtual simulation of plant operations.

16. The non-transitory computer-readable medium according to claim 14, wherein an anticipated condition is an AGV transport order requesting the AGV vehicle to a specific working area which can be covered by the AGV vehicle allocated in a dummy task at the specific plant location.

17. The non-transitory computer-readable medium according to claim 16, wherein the dummy task in a given location may be used to cover multiple anticipated conditions linked to arrivals of a set of AGV transport orders in a set of multiple locations coverable from the given location.

18. The non-transitory computer-readable medium according to claim 15, wherein the data set of the virtual simulation is selected from the group consisting of:

the transport orders sent by the order generator to each of the fleet managers to each of the AGV;

signals and sensor states before the transport orders are sent;

robotic tasks preceding the transport orders and their corresponding duration times;

number of parts moved on each conveyor and their types;

number of robotic operations, their types and corresponding robots;

employed times of each of the AGVs for reaching its target position;

status situations in precedent and subsequent workstations;

human tasks; and other relevant plant statuses.

19. The non-transitory computer-readable medium according to claim 14, wherein the specific set of anticipating plant status conditions are selected from the group consisting of:

a set of conditions on plant signals;

a set of conditions on plant sensors;

a set of conditions on plant statuses;

a set of conditions on statuses of any plant equipment or of any plant object or of any human; and a set of conditions combining any of the above.

20. The non-transitory computer-readable medium according to claim 14, wherein, during plant operations, the order generator is enabled to receive a new anticipating logical rule.

* * * * *